(12) United States Patent
Morimoto et al.

(10) Patent No.: US 6,460,792 B1
(45) Date of Patent: Oct. 8, 2002

(54) SPINNING REEL ROTATION TRANSMISSION DEVICE

(75) Inventors: Shin'ichi Morimoto, Hyogo; Yoshiyuki Furomoto, Osaka, both of (JP)

(73) Assignee: Shimano Inc., Osaka (JP)

( * ) Notice: Subject to any disclaimer, the term of this patent is extended or adjusted under 35 U.S.C. 154(b) by 13 days.

(21) Appl. No.: 09/657,525

(22) Filed: Sep. 8, 2000

(30) Foreign Application Priority Data

Sep. 9, 1999 (JP) .......................................... 11-255413
Feb. 17, 2000 (JP) ...................................... 2000-038957

(51) Int. Cl.⁷ ............................................... A01K 89/01
(52) U.S. Cl. ..................................................... 242/241
(58) Field of Search ................................ 242/241, 242, 242/321, 311, 278, 279

(56) References Cited

U.S. PATENT DOCUMENTS 5,232,181 A * 8/1993 Fujine .......................... 242/241
5,308,017 A * 5/1994 Yoshijawa ................... 242/241
5,816,516 A * 10/1998 Yamaguchi ................. 242/246
5,890,668 A * 4/1999 Hitomi ......................... 242/241

FOREIGN PATENT DOCUMENTS

JP 11000086 1/1999

* cited by examiner

Primary Examiner—Emmanuel M. Marcelo
(74) Attorney, Agent, or Firm—Shinjyu Global IP Counselors, LLP

(57) ABSTRACT

Oscillating mechanism rotation transmission device that maintains high linking-shaft mounting precision and attains a reel made lightweight overall. The spinning-reel rotation transmission device (14) transmits handle rotation the oscillating mechanism (6), and is provided with: a pinion gear (12); a linking shaft (36); a first bearing (28), a second bearing (29), a first gear (37), a second gear (38), and a third gear (39). The linking shaft is disposed along an axis offset from the pinion gear. The first bearing is detachably fixed to the reel unit and rotatively supports one end of the linking shaft. The second bearing is furnished in the reel unit and rotatively supports the other end of the linking shaft. The first gear is furnished on the linking shaft and meshes with the pinion gear. The second gear is furnished on the linking shaft at a spacing from the first gear. The third gear is linked to the reciprocative shifting mechanism and meshes with the second gear.

18 Claims, 7 Drawing Sheets

SPINNING REEL ROTATION TRANSMISSION DEVICE

BACKGROUND OF THE INVENTION

1. Technical Field

The present invention relates to rotation transmission devices, and more particularly to spinning reel rotation transmission devices that transmit handle rotation to an oscillating mechanism for reciprocatingly shifting back and forth the spool fitted to the reel unit of the spinning reel.

2. Description of Related Art

As an example of a spinning-reel oscillating mechanism (reciprocative shifting mechanism), traverse cam systems are known. This oscillating mechanism has a worm (spirally threaded/grooved shaft for a worm gear) disposed parallel to the spool shaft and a slider engaged with the worm, with the spool shaft axially immovably fitted to the slider. The rotation transmission device for transmitting handle rotation to the worm has a pinion gear that meshes with a master gear rotating while being coupled with the handle rotation, and an intermediate gear that meshes with the pinion gear, with the intermediate gear being non-rotatably attached to one end of the worm.

Thus with the traverse-cam type of oscillating mechanism, the amount by which the spool travels per rotation of the rotor is determined by the lead angle of the worm (inclination of the worm thread from a plane perpendicular to the worm axis). This means that there is much space between the fishing line coils, which keeps the fishing line from winding onto the spool efficiently.

Therein, Japanese Laid-Open Pat. App. 1999-86 discloses an oscillating mechanism that reduces the amount of back-and-forth movement of the spool with respect to the handle rotation, enabling the fishing line to be wound closely onto the spool. The rotation transmission device for transmitting handle rotation to this oscillating mechanism is provided with: a pinion gear; a linking shaft disposed toward the oscillating mechanism along an axis offset from the pinion gear; a screw gear fixed to one end of the linking shaft and that meshes with the pinion gear; a worm gear fixed to the other end of the linking shaft; and a worm wheel non-rotatably fitted to the worm and that meshes with the worm gear. The linking shaft is rotatively supported in the reel unit, and flanks the spool shaft opposite an opening section sealed off by a reel unit lid.

Because the linking shaft is rotatively supported in the reel unit in the foregoing conventional close-winding rotation transmission device, machining the inside of the reel unit to maintain high linking-shaft mounting precision of the complexly formed reel unit interior that also supports a plurality of other shafts is difficult. If the linking-shaft mounting precision is not kept high, the inter-shaft distance between the linking shaft and the spool shaft, and between the linking shaft and the worm will fluctuate. Fluctuations in the inter-shaft distance diminish the meshing precision between the pinion gear and the screw gear, and the meshing precision between the worm wheel and the worm gear, degrading rotation transmission efficiency. Furthermore, to furnish a support structure for the linking shaft on the inside of the reel unit would bring about the need for building-in rib and boss structures on the reel unit inside, leading to reel-unit weight increases.

SUMMARY OF THE INVENTION

An object of the present invention is, in a rotation transmission device for transmitting handle rotation to a reciprocative shifting mechanism via a linking shaft, to maintain high linking-shaft mounting precision, and moreover attain a reel that overall is made lightweight.

Further because rotation transmission devices of this sort are configured with a plurality of gears, maintenance so as to maintain a state of high transmission efficiency becomes important. Maintenance entails the work of coating the gears with a lubricant such as grease. In the foregoing conventional configuration, however, the linking shaft is hidden behind the spool shaft, which makes it difficult to coat the gears with lubricant even with the reel unit lid open, hindering maintenance.

Another object of the present invention is to facilitate performing maintenance on a rotation transmission device.

A spinning-reel rotation transmission device as determined by a first aspect of the invention is a device which transmits handle rotation to a reciprocative shifting mechanism for reciprocatingly moving back-and-forth the spool fitted to the reel unit of the spinning reel, and is provided with: a pinion gear; a linking shaft; a first bearing; a second bearing; and a first gear, a second gear, and a third gear. The pinion gear is a gear to which the rotation of the handle is transmitted. The linking shaft is a shaft that is disposed along an axis offset from the pinion gear and enables linking of the reciprocative shifting mechanism and the pinion gear. The first bearing component is detachably fixed to the reel unit and rotatably supports one end of the linking shaft. The second bearing component is furnished on the reel unit and rotatably supports the other end of the linking shaft. The first gear is furnished on the linking shaft and meshes with the pinion gear. The second gear is furnished on the linking shaft at a different location from the first gear. The third gear is linked to the reciprocative shifting mechanism and meshes with the second gear.

With this rotation transmission device, when the handle is rotated, the pinion gear rotates correspondingly. The rotation of the pinion gear is transmitted to the first gear that meshes therewith, and the linking shaft rotates. This linking shaft is provided with a second gear in addition to the first gear, and the second gear also rotates when the linking shaft rotates. When the second gear rotates, the third gear that meshes therewith also rotates, the reciprocative shifting mechanism is actuated, and the spool is reciprocatingly shifted back and forth. One end of the linking shaft is supported by the first bearing component, which is detachably fixed to the reel unit, and the other end is supported by the second bearing component furnished on the reel unit. Therefore, just the second bearing component supporting the other end of the linking shaft needs to be built into the reel unit, and there is no need to build in the first bearing component. Accordingly, a high-precision first bearing component can be fabricated more easily and from fewer parts—just one bearing component having to be built into the reel unit with its complex shape—the precision of the second bearing component is easier to maintain; and the mounting precision of the linking shaft can be kept high. Furthermore, since the first bearing component has a simpler shape than when it is built into the reel unit, the reel overall is made lightweight.

The spinning-reel rotation transmission device as determined by a second aspect of the invention is the device according to the first aspect, further wherein the pinion gear is a screw gear and the first gear is a screw gear that meshes with the pinion gear. In this case, rotation will be properly transmitted from the pinion gear to the first gear even though the pinion gear is disposed so that it is offset from the first gear.

As determined by a third aspect of the invention, the rotation transmission device is that according to the above-described aspects, and moreover wherein the second gear is a worm gear and the third gear is a worm wheel. In this case, rotation that is transmitted from the second gear to the third gear can be greatly reduced in speed, allowing the rate of back-and-forth movement of the spool to be effectively reduced with respect to the rotation of the handle.

The rotation transmission device as determined by a fourth aspect of the invention is the device according to the first or second aspects, yet further wherein the second gear is a screw gear and the third gear is a screw gear that meshes with the second gear. Herein, enlarging the gear-down ratio is difficult, but manufacture is easier.

As determined by a fifth aspect of the invention, a spinning-reel rotation transmission device is that according to any of the first to fourth aspects, further wherein the linking shaft is disposed diagonally to the reel unit. In this case, even though a linking shaft is provided, a good balance can be maintained in the size in the horizontal (left and right) direction and in the vertical (up and down) direction while the reel unit can be made more compact.

The rotation transmission device as determined by a sixth aspect is that according to any of the first to fifth aspects of the invention, and moreover wherein the reciprocative shifting mechanism is a traverse cam type of reciprocative shifting mechanism that reciprocatingly shifts the spool in engagement with the rotation of a spiral shaft disposed parallel to the pinion gear, and the third gear is non-rotatably fitted to the spiral shaft. In this case, a larger gear-down ratio can be obtained than when the rotation of the pinion gear is transmitted directly to the spiral shaft.

The spinning-reel rotation transmission device as determined by a seventh aspect of the present invention is the device according to any of the first to sixth aspects, wherein the first bearing component is fitted in a through hole in the reel unit that is formed to the rear of the rotor of the spinning reel and has an inside diameter larger than the outside diameter of the second gear, and the second gear is disposed at one end of the linking shaft and has the same diameter as the first gear or a larger diameter than the first gear. In this case, because the first bearing component is fitted in a through hole formed to the rear of the rotor, and the diameter of the second gear which is closer to the first bearing component is smaller than that of the first gear, the linking shaft can be removed from the through hole along with both of these gears merely by removing the first bearing component from the reel unit. Accordingly, there is no need to remove the rotor or open any other portion of the reel unit and take out the parts of the reciprocative shifting mechanism or the spool shaft, which facilitates the maintenance of the rotation transmission device.

As determined by an eighth aspect of the invention, a spinning-reel rotation transmission device is that according to any of the first to seventh aspects, yet further wherein the gear ratio between the pinion gear and the third gear is between 4:1 and 24:1. In this case, the fishing line can be wound more closely onto the spool because the reciprocative shifting mechanism side is geared-down compared to the conventional configuration.

As determined by a ninth aspect rotation transmission device is that according to any of the preceding aspects, and additionally wherein the first bearing component has a lid member detachably fitted to the reel unit, and a ball bearing fitted to the lid member, with one end of the linking shaft being rotatably supported by the ball bearing. In this case, rotation efficiency is higher because the linking shaft is supported by a ball bearing.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

Overall Configuration and Reel Unit Structure

Figure 1:
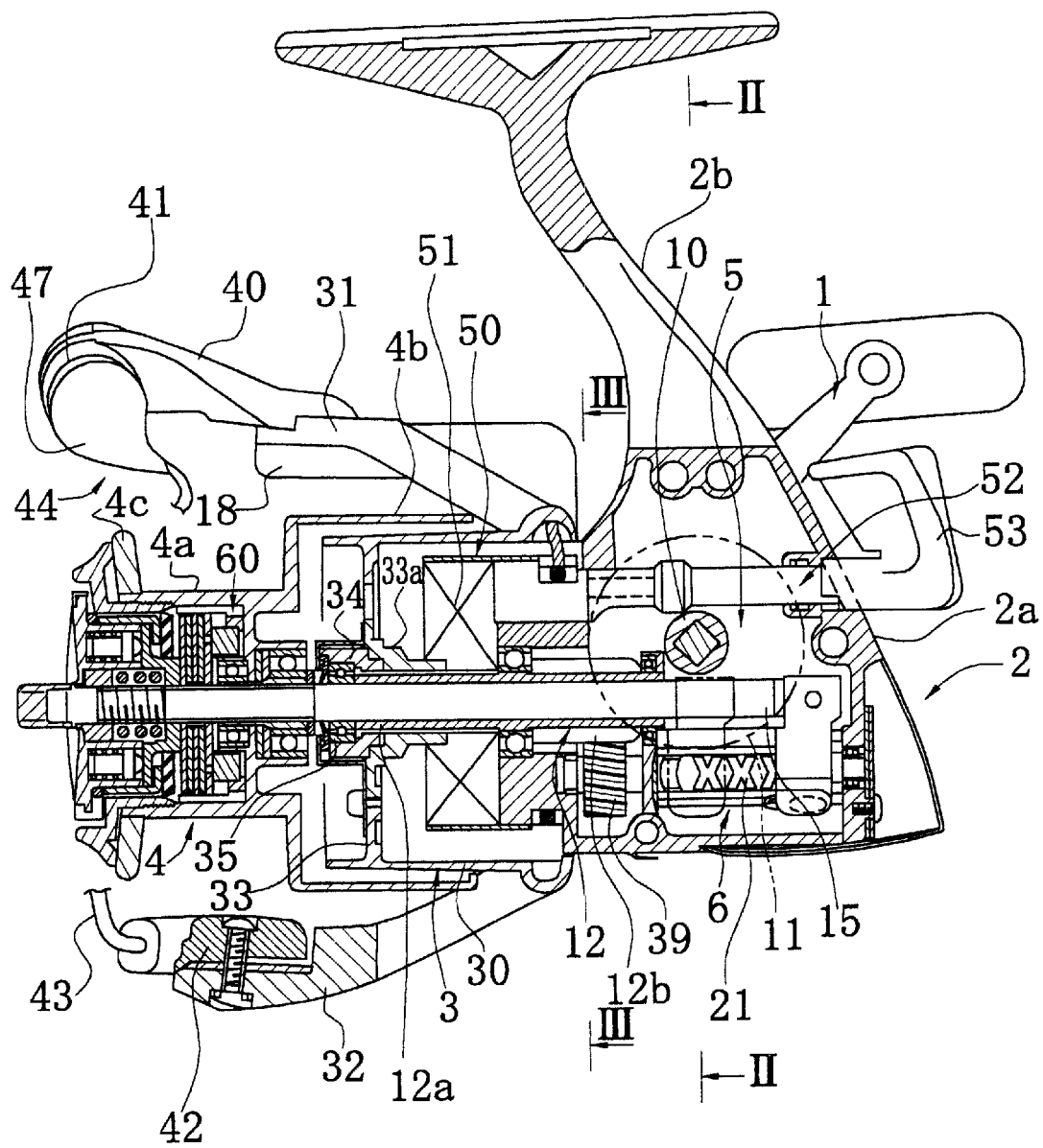
FIG. 1 is a is a cross section of the left side of a spinning reel in which an embodiment of the present invention is employed.

FIG. 1 shows a spinning reel in which an embodiment of the present invention has been employed, comprising a handle 1, a reel unit 2 that rotatably supports the handle 1, a rotor 3, and a spool 4. The rotor 3 is rotatably supported by the front part of the reel unit 2. The spool 4 has fishing line wound around its outer peripheral surface and is disposed at the front part of the rotor 3 so as to be capable of back-and-forth movement.

The reel unit 2 has a reel body 2a with an opening 2c on the side, a T-shaped pole attachment foot 2b that extends diagonally upward and forward from the reel body 2a, and a cover 2d used for closing off the opening 2c in the reel body 2a.

Figure 2:
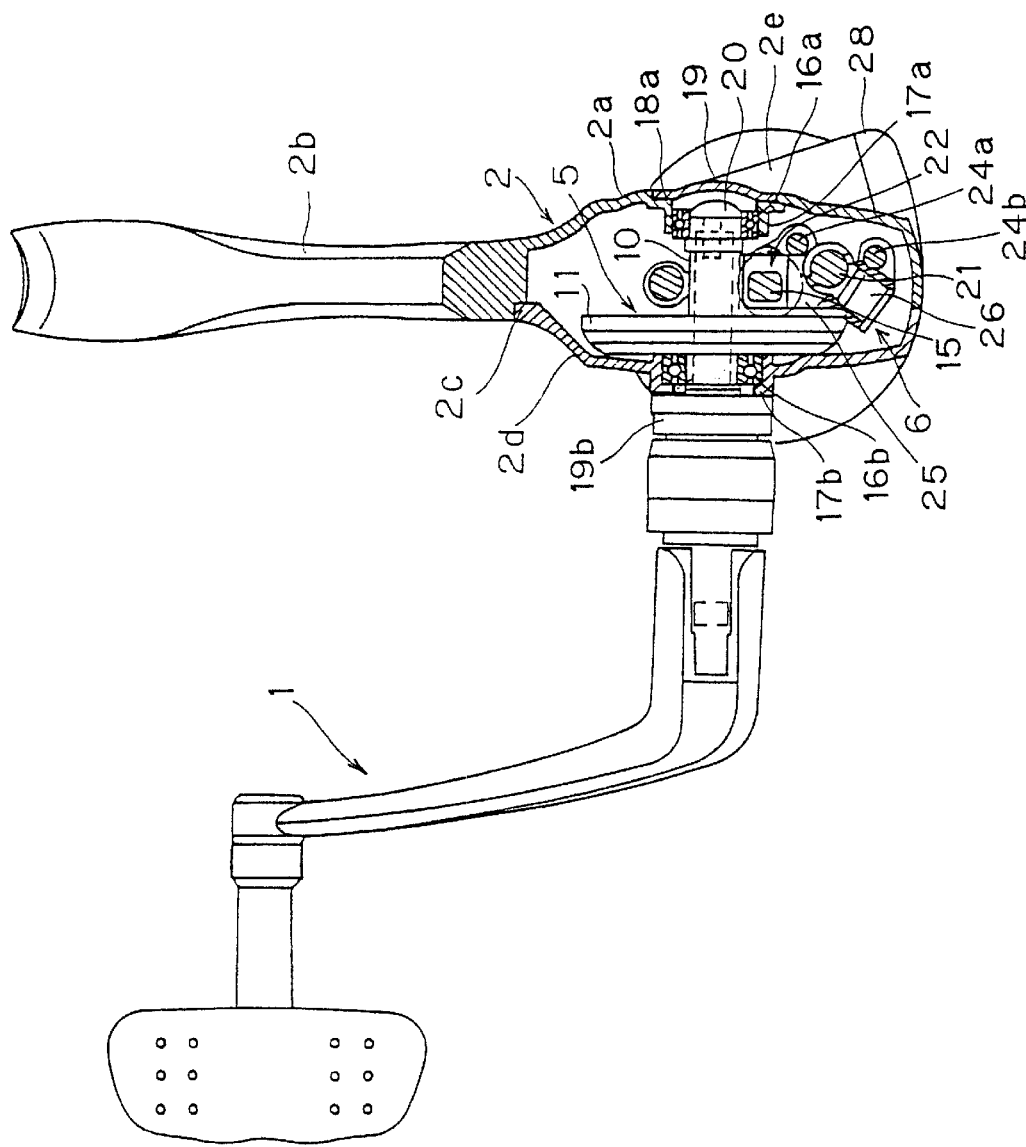
FIG. 2 is a cross section along the II—II line in FIG. 1.
Figure 3:
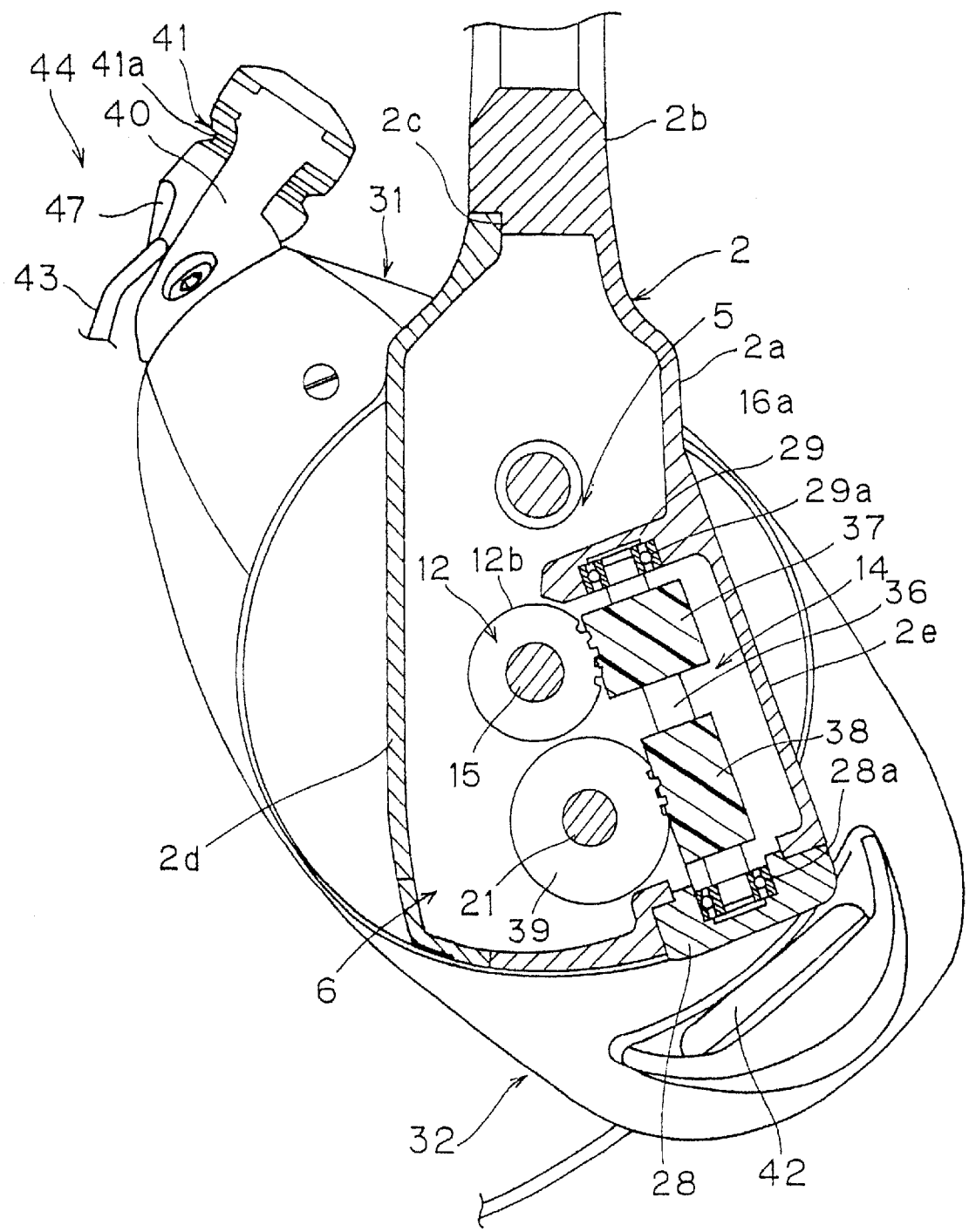
FIG. 3 is a cross section along the III—III line in FIG. 1.

As shown in FIGS. 2 and 3, the reel body 2a has a space on the inside, and in this space are provided a rotor drive mechanism 5 for rotating the rotor 3 in unison with the rotation of the handle 1, and an oscillating mechanism 6 for moving the spool 4 back and forth and uniformly winding the fishing line.

As shown in FIG. 2, a cylindrical boss 17a is formed on the right side (in FIG. 2) of the reel body 2a. The boss 17a is formed protruding to the inside of the reel body 2a in order to accommodate a bearing 16a that supports the right end (in FIG. 2) of a handle shaft 10 (discussed below). A boss 17b is formed at a location across from the boss 17a on the cover 2d. The boss 17b is formed protruding to the outside of the reel body 2a in order to accommodate a bearing 16b that supports the left end (in FIG. 2) of the handle shaft 10. The boss on the side opposite the side where the handle 1 is fitted (the boss 17a in FIG. 2) is closed off by a shaft cover 19. The boss on the side where the handle 1 is fitted (the boss 17b in FIG. 2) prevents water from coming in from a perforated cover 19b. The shaft cover 19 and the perforated cover 19b are elliptical members, each of which is attached to a boss by two screws. An elliptical recess 18a for fitting the shaft cover 19 and the perforated cover 19b on one side is formed in the boss 17a, which does not protrude to the outside.

As shown in FIG. 3, a bulge 2e for accommodating a rotation transmission mechanism 14 (FIG. 3; discussed below) is formed in front of the boss 17a of the reel body 2a. The cover 2d is formed diagonally so that it increasingly protrudes toward the bottom, and a first bearing component 28 which is a part of the rotation transmission mechanism 14 is detachably fitted at the lower end of the bulge 2e. A second bearing component 29 that protrudes to the inside of the reel body 2a is formed at the proximal end of the bulge 2e.

As shown in FIGS. 1 and 2, the rotor drive mechanism 5 has a handle shaft 10 to which the handle 1 is non-rotatably fitted, a face gear 11 that rotates along with the handle shaft 10, and a pinion gear 12 that meshes with this face gear 11. The ends of the handle shaft 10 are rotatably supported by the reel body 2a via the bearings 16a and 16b. The right end (in FIG. 2) of the handle shaft 10 is located further to the inside than the outer surface of the bearing 16a. A through hole with a rectangular cross section is formed in the center of the handle shaft 10, and the handle 1 is non-rotatably inserted into this through hole. A threaded hole is formed in the distal end surface of the handle 1, and the handle 1 is attached to the handle shaft 10 by an attachment screw 20 that meshes with this threaded hole.

Oscillating Mechanism Configuration

The oscillating mechanism 6 is used to move a spool shaft 15, which is fixed in the center of the spool 4, in the back-and-forth direction in unison with the rotor 3, and thereby move the spool 4 in the same direction. The rotation of the handle 1 is transmitted to the oscillating mechanism 6 via the rotation transmission mechanism 14.

Figure 4:
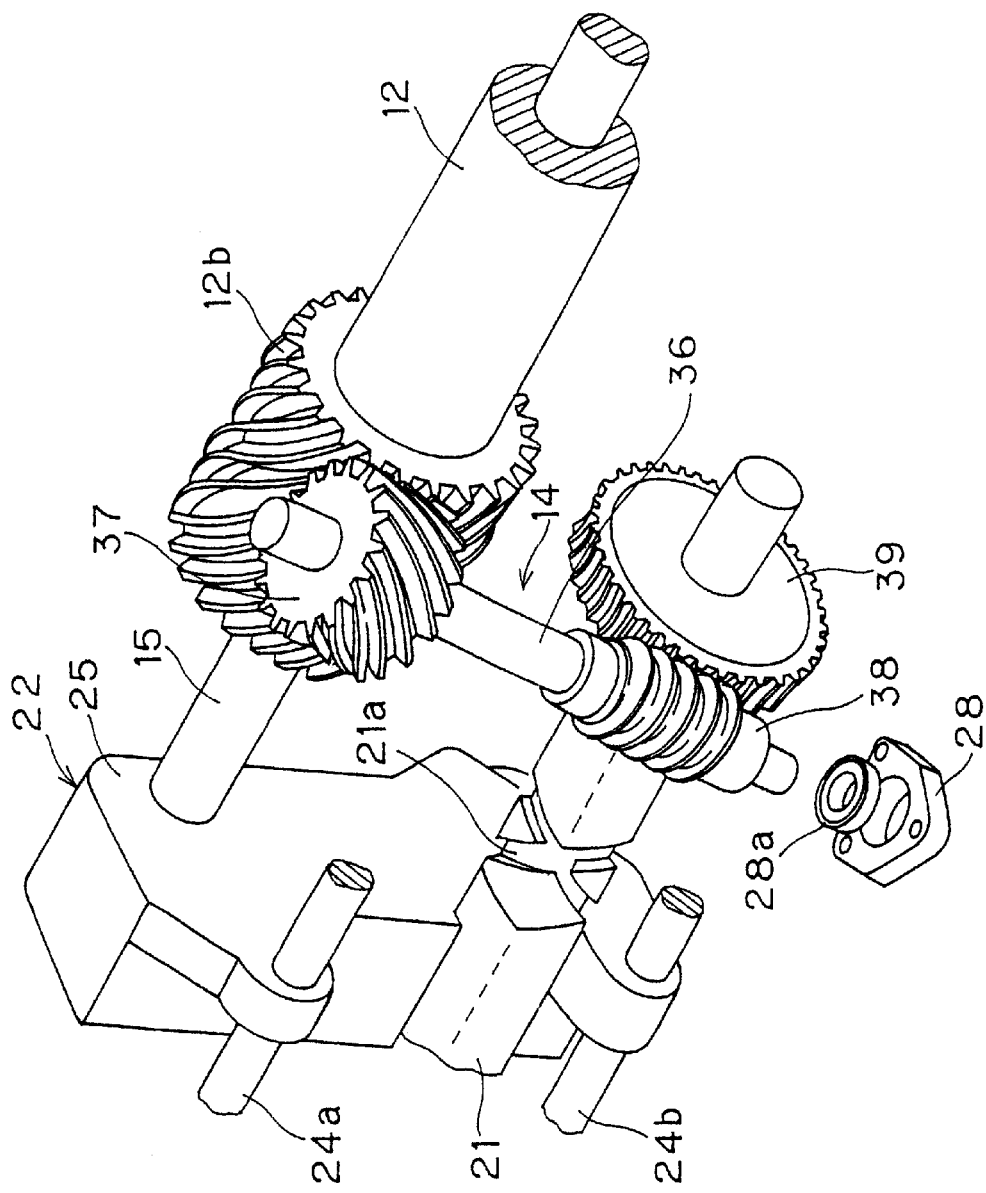
FIG. 4 is an oblique view of the rotation transmission device.

As shown in FIGS. 1, 2, and 4, the oscillating mechanism 6 has a spiral shaft 21 disposed beneath the spool shaft 15, a slider 22 that moves in the back-and-forth direction along the spiral shaft 21, and two guide shafts 24a and 24b that guide the slider 22. The spiral shaft 21 is disposed parallel to the spool shaft 15, and is rotatably supported by the reel body 2a. Spiral intersecting grooves 21a are formed around the outer periphery of the spiral shaft 21. The lead angle θ of these grooves 21a is set between 20 and 45°. The lead angle θ of the spiral grooves 21a is the angle expressed by the following equation, where D is the bottom diameter of the grooves 21a and L is the axial length advanced in one rotation of the spiral shaft 21, i.e., the lead.

$$\text{lead angle } \theta = \text{arc cot } (\pi D/L)$$

It is undesirable for this lead angle θ to be less than 20° because the walls will be too thin between the grooves and the number of intersections between the grooves will increase. On the other hand, it is also undesirable for this angle to be over 45° because there will be a decrease in efficiency in the conversion from rotational motion to linear motion.

The slider 22 has a slider body 25 and an engagement component 26 that is held inside the slider body 25. The slider body 25 is guided parallel to the spool shaft 15 by the guide shafts 24a and 24b. The engagement component 26 is rotatably fitted inside the slider body 25, and the distal end of the engagement component 26 meshes with the grooves 21a in the spiral shaft 21.

As shown in FIGS. 3 and 4, the rotation transmission mechanism 14 is held inside the bulge 2e, and has the pinion gear 12, a linking shaft 36, the first bearing component 28 which rotatably supports the lower end of the linking shaft 36, the second bearing component 29 which rotatably supports the upper end of the linking shaft 36, and first to third gears 37 to 39. The pinion gear 12 is a part of both the rotor drive mechanism 5 and the rotation transmission mechanism 14. The pinion gear 12 has a gear component 12b comprising a screw gear at its rear, and this gear component 12b meshes with the face gear 11.

The linking shaft 36 is disposed diagonally along an axis that is offset from the pinion gear 12 so as to allow the linking shaft 36 to be linked to the spiral shaft 21, and is disposed on the inside of the bulge 2e. More specifically, the linking shaft 36 is tilted with respect to the plane intersecting with the handle shaft 10 so that it forms an axial intersection angle of 90 degrees to the pinion gear 12 and to the spiral shaft 21. In other words, the linking shaft 36 is disposed so that it is tilted diagonally in the horizontal (left and right) direction and the vertical (up and down) direction with respect to the reel unit 2. Thus disposing the linking shaft 36 diagonally allows the reel unit 2 to be made more compact, while maintaining a good balance in the size in the horizontal and vertical directions.

The first bearing component 28 is detachably fitted to the lower surface of the bulge 2e formed in the reel body 2a as discussed above, and is fixed thereto by screws. The second bearing component 29 is formed protruding to the inside of the reel body 2a from the proximal end of the bulge 2e as discussed above. The first and second bearing components 28 and 29 have bearings 28a and 29a, respectively, for rotatably supporting the linking shaft 36.

The first gear 37 is a screw gear that meshes with the gear component 12b of the pinion gear 12 at a plane on the opposite side from where the face gear 11 meshes, and is non-rotatably fixed to the linking shaft 36. The second gear 38 is a worm gear, and is furnished on the linking shaft 36 at a distance from the first gear 37. This second gear 38 is formed integrally with the linking shaft 36. The third gear 39 is a worm wheel that meshes with the second gear 38, and is non-rotatably fixed to the front end of the spiral shaft 21.

The gear-down ratio NC of the rotation transmission mechanism 14 (the ratio of rotation of the spiral shaft 21 to the rotation of the pinion gear 12) is set so that the amount of movement RM of the spool 4 per rotation of the rotor 3 will be the same as the line diameter DL. In other words, the amount of movement RM of the spool 4 is set so that the fishing line will be wound around the spool 4 while being shifted by the fishing line diameter DL for every rotation of the rotor 3. Here, if we let L be the above-mentioned lead (the amount of movement per rotation of the spiral shaft 21) and DL be the diameter of the fishing line, then when the fishing line is wound around the spool 4 while being shifted by the line diameter DL for every rotation of the rotor 3, the gear-down ratio NC, which is the ratio of the number of rotations of the spiral shaft 21 per rotation of the rotor 3, will be NC=DL/L.

Figure 5:
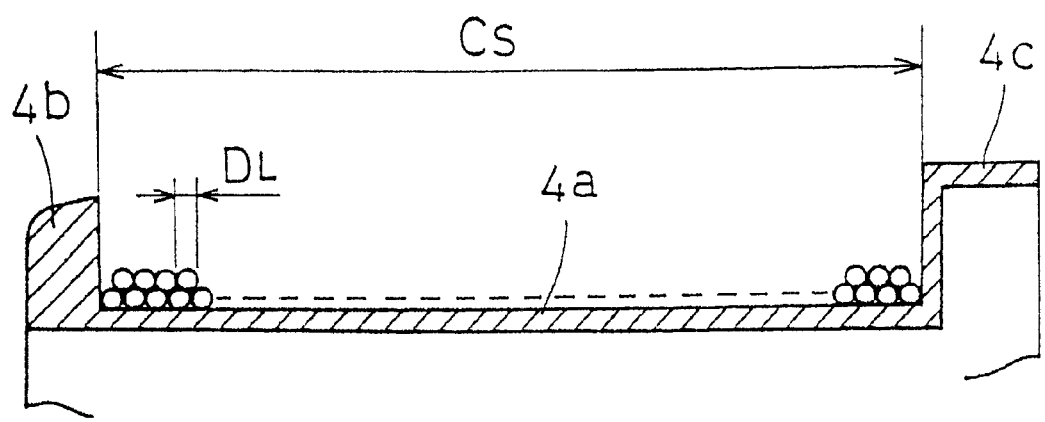
FIG. 5 is a schematic cross section of the spool.

For example, if the line diameter DL is 0.2 mm (No. 1.5) and the lead L is 3.6° mm, the gear-down ratio NC will be NC=0.2/3.6=1/18. In other words, if the gear-down ratio NC from the rotor 3 to the spiral shaft 21 is set to 1/18, the spool 4 will be shifted by 0.2 mm for every rotation of the rotor 3, and the fishing line will be closely wound around the spool 4. In this case, if, for example, there is a reduction of 1/2 between the gear component 12b and the first gear 37, and there is a reduction of 1/9 between the second gear 38 and the third gear 39, the overall gear-down ratio NC can be set to 1/18, and the fishing line will be wound around the spool 4 while being shifted by the line diameter DL for every rotation of the rotor 3 so that the fishing line is closely wound around the spool 4, as shown in FIG. 5. The lead angle is smaller at the ends of the grooves 21a of the spiral shaft 21 than elsewhere in order to change the direction of advance, so at these portions the lead L of the spiral shaft 21 is smaller and the above-mentioned amount of movement RM is also smaller.

If we let NC be the number of rotations of the spiral shaft 21 required to move the spool 4 back and forth one cycle, this number must always be an integer, but if the corresponding number of rotations of the rotor 3 is an integer (that is, if the rotational phase is 2nπ), then the point where the fishing line on a lower layer intersects with the fishing line on an upper layer will always appear in the same phase, so a cross section of the wound line perpendicular to the center axis of the spool will have a shape that protrudes in two directions, as with an ellipse. This will happen even if the rotational phase is (2n+1)π, and if it is (2n +1/2 )π, then the cross section will have a shape close to square. In order to achieve a polyhedral shape closer to a circle, the rotational phase should be 2n+ι, so that when ι is multiplied by an integer, it cannot be divided evenly by 2nπ. If ι is too small, however, protruding portions will occur continuously and contiguously, so the line winding shape will become spiral.

For instance, using the above example, if the number of rotations of the spiral shaft 21 required to move the spool 4 back and forth one cycle is 10, the corresponding number of rotations of the rotor 3 is 180. However, by changing the lead L from 3.6 to 3.666 mm, the gear-down ratio NC becomes 200/3666, and the number of rotations of the rotor 3 becomes 183.3. This allows the cross section of the wound line perpendicular to the center axis of the spool to have a polyhedral shape that is close to circular.

Rotor Structure

As shown in FIG. 1, the rotor 3 has a cylindrical component 30 and first and second rotor arms 31 and 32 provided facing each other to the sides of the cylindrical component 30. The cylindrical component 30 and the rotor arms 31 and 32 are integrally molded.

A front wall 33 is formed at the front part of the cylindrical component 30, and a boss 33a is formed in the center of the front wall 33. The spool shaft 15 and the front part 12a of the pinion gear 12 pass through a hole in this boss 33a. A nut 34 is disposed on the front side of the front wall 33, and this nut 34 is threaded onto the threaded portion at the distal end of the pinion gear 12. A bearing 35 for rotatably supporting the nut 34 with respect to the spool shaft 15 is disposed around the inside of the nut 34.

A bail arm 44 is fitted at the distal ends of the first and second rotor arms 31 and 32 so as to be pivotable between a line reeling position and a line release position. As shown in FIGS. 1 and 3, the bail arm 44 has first and second bail support members 40 and 42 that are pivotably fitted to the inside of the distal ends of the first and second rotor arms 31 and 32, a fixed shaft cover 47 including a fixed shaft fixed at the proximal end to the distal end of the first bail support member 40, a line roller 41 that guides the fishing line to the spool 4, and a bail 43 that links the fixed shaft cover 47 and the second bail support member 42. As shown in FIG. 1, the first bail support member 40 is pivotably fitted to the outside at the distal end of the first rotor arm 31. The second bail support member 42 is pivotably fitted to the inside at the distal end of the second rotor arm 32.

The line roller 41 is rotatably supported by the fixed shaft via a bearing (not shown). The line roller 41 is a drum-shaped member whose peripheral surface has two tapered surfaces formed on it so that the center part in the axial direction has a smaller diameter. A peripheral groove 41a is formed around this small-diameter portion. This peripheral groove 41a has a width of 2 mm or less, and preferably no more than twice the line diameter. Reducing the width of the peripheral groove 41a in this way makes the fishing line less apt to shift in the axial direction of the spool 4, and allows the line to be wound around the spool 4 more precisely when the movement of the spool 4 slows.

A reverse check mechanism 50 for the rotor 3 is disposed inside the cylindrical component 30 of the rotor 3. The reverse check mechanism 50 has a roller-type one-way clutch 51 and a control mechanism 52 for switching the one-way clutch 51 between an operating state and a non-operating state. The one-way clutch 51 has an outer ring fixed to the reel body 2a and an inner ring non-rotatably fitted to the pinion gear 12. The control mechanism 52 has a control lever 53 disposed at the rear of the reel body 2a. The one-way clutch is switched between its two states by swinging the control lever 53. In the operating state, the rotor 3 is prevented from reversing, whereas the rotor 3 is able to reverse in the non-operating state.

Spool Structure

The spool 4 is disposed between the first rotor arm 31 and the second rotor arm 32 of the rotor 3, and is fixed to the distal end of the spool shaft 15 via a drag mechanism 60. The spool 4 has a line winding cylinder 4a around the outer periphery of which the fishing line is wound, a skirt 4b formed integrally at the rear of the line winding cylinder 4a, and a front flange 4c fixed to the front part of the line winding cylinder 4a. The line winding cylinder 4a is a cylindrical member that extends to the outer peripheral side of the cylindrical component 30 of the rotor 3. The skirt 4b and the front flange 4c spread outward radially and perpendicularly from the ends of the line winding cylinder 4a. As a result, when the fishing line is wound around the line winding cylinder 4a of the spool 4, the number of coils of fishing line is substantially equal at each line winding stage.

Reel Control and Operation

To cast with this spinning reel, the bail arm 44 is lowered from its line reeling position to its line release position. As a result, the first and second bail support members 40 and 42 swing in the same direction.

When the line is to be reeled in, the bail arm 44 is swung over to the line reeling position. This is performed automatically by the action of a cam and spring (not shown) as soon as the handle 1 is rotated in the line winding direction. When the handle 1 is rotated in the line winding direction, this rotational force is transmitted to the pinion gear 12 via the handle shaft 10 and the face gear 11. The rotational force transmitted to the pinion gear 12 is transmitted to the rotor 3 via the front part 12a of the pinion gear 12, and the rotor 3 rotates in the line winding direction.

Meanwhile, the linking shaft 36 is rotated by the first gear 37 that meshes with the pinion gear 12, the third gear 39 is rotated via the second gear 38, and the spiral shaft 21 rotates at a speed reduced by the above-mentioned gear-down ratio NC. As a result, the slider 22 that meshes with the grooves 21a in the spiral shaft 21 is guided by the guide shafts 24a and 24b and moves in the back-and-forth direction. The amount of movement RM of the spool 4 here corresponds to the line diameter DL as discussed above. The spool shaft 15 and the spool 4 move back and forth in the back-and-forth direction, and the fishing line guided to the spool 4 by the bail 43 and the line roller 41 is wound around the line winding cylinder 4a of the spool 4 while being shifted by the line diameter DL for every rotation of the rotor 3, as shown in FIG. 5, which allows the fishing line to be wound closely on the spool 4. Accordingly, the fishing line is wound onto the spool 4 more efficiently.

Other Embodiments (a) The configuration of the spinning reel is not limited to the above embodiment, and the present invention can also be applied to a spinning reel that has no drag mechanism, or has it at the rear, or one in which a braking mechanism having a brake lever is fitted instead of the reverse check mechanism.

(b) The configuration of the first to third gears is not limited to the above embodiment, and gears of various configurations can be applied, such as screw gears, bevel gears, or face gears. If screw gears are used, the gear-down ratio will be smaller than with a worm, but manufacture will be easier. If screw gears are used, the diameter of the first gear 37 can be made smaller than the diameter of the second gear 38, which facilitates maintenance.

Figure 6:
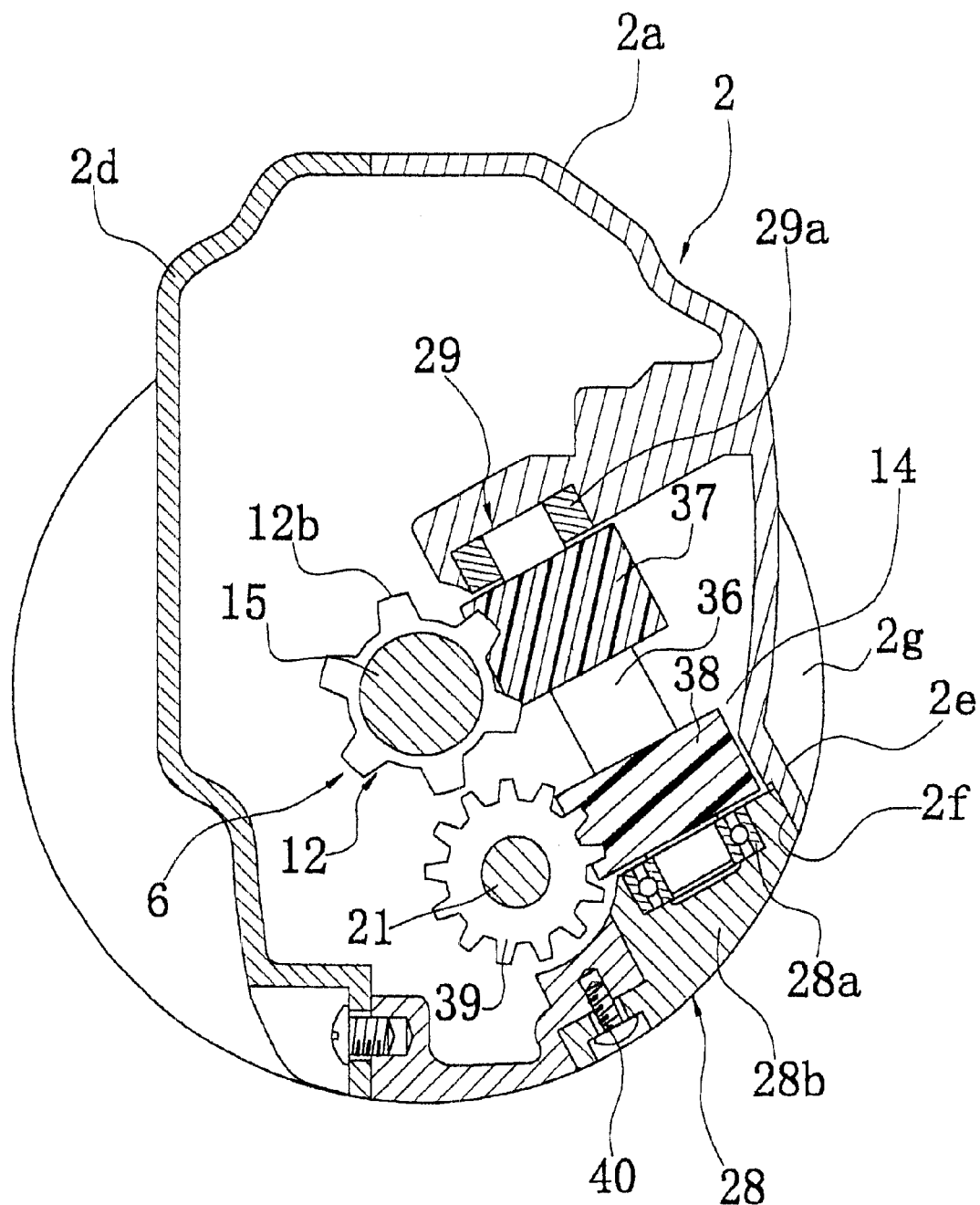
FIG. 6 a diagram corresponding to FIG. 3 of another embodiment.
Figure 7:
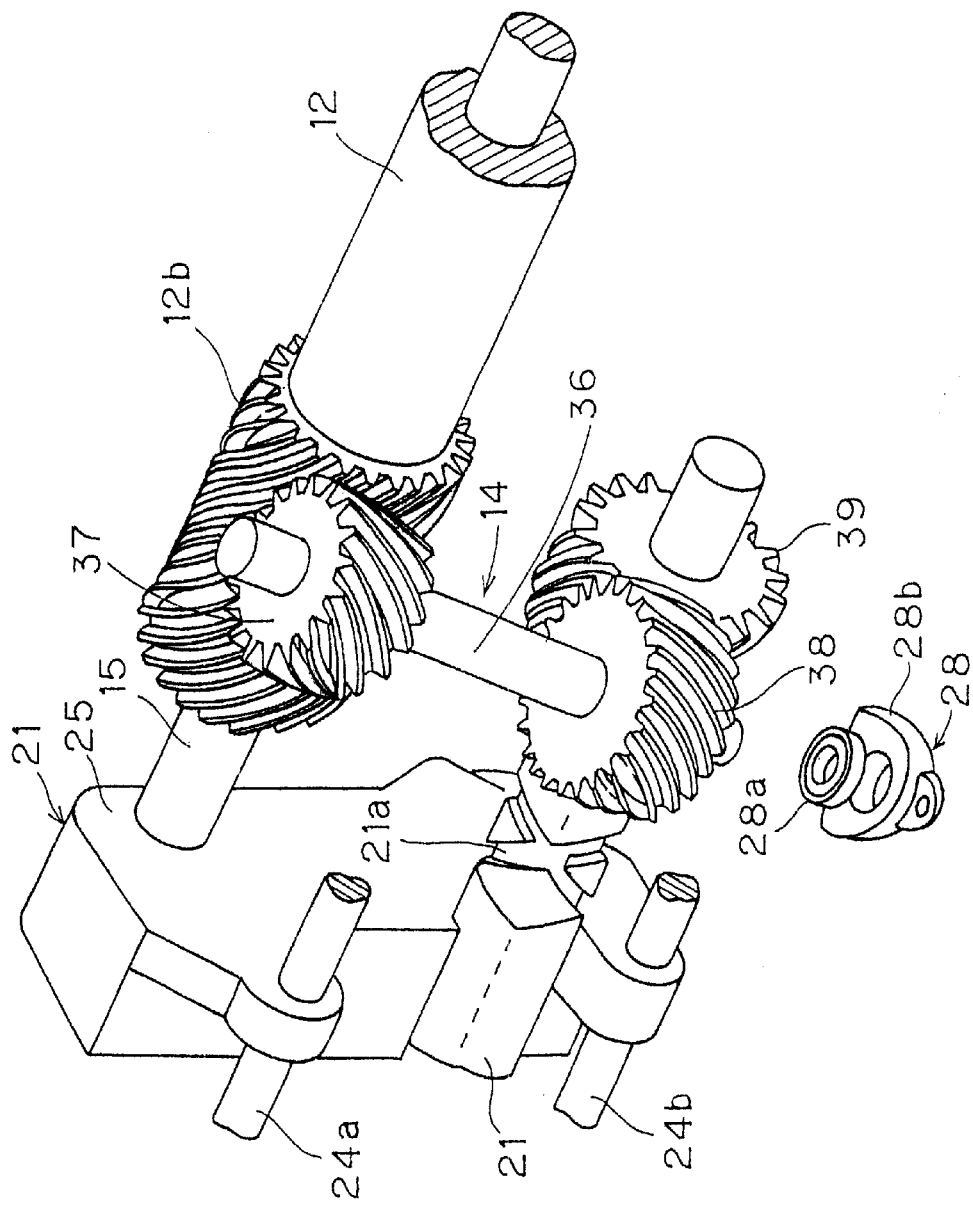
FIG. 7 is a diagram corresponding to FIG. 4 of another embodiment.

In FIGS. 6 and 7, in this embodiment, the first gear 37, second gear 38, and third gear 39 that make up the rotation transmission mechanism 14 are all screw gears. The rest of the structure is substantially the same as in the above embodiment, and will therefore not be described again.

The gear-down ratio NC of this rotation transmission device 14 is about 1/5, for example. The range of this gear-down ratio NC is preferably 1/4 to 1/24. If this gear-down ratio NC is less than 1/4, the movement of the spool 4 will be so fast that the line will not be wound onto the spool 4 sufficiently closely. If 1/24 is exceeded, however, the movement of the spool 4 will be too slow, and even fine fishing line may sometimes be wound twice for every rotation of the rotor 3.

Here, the second gear 38 has a smaller outside diameter than the first gear 37. The pitch cylinder helix angle (hereinafter referred to as helix angle) of the pinion gear 12 is set, for example, to 55 degrees and the helix angle of the first gear 37 to 35 degrees. The helix angle of the second gear 38 is set, for example, to 77.5 degrees, and the helix angle of the second gear 38 to 13.5 degrees. Thus, the helix angles of the pinion gear 12 and the second gear 38 are larger with respect to the first gear 37 and the third gear 39, so the gear-down ratio can be increased with respect to changes in the outside diameter. FIG. 7 is a schematic diagram of these gears 12 and 37 to 39, and the helix angles and number of teeth are not drawn accurately.

The first bearing component 28 has a cover member 28b detachably fitted to the reel body 2a, and a ball bearing 28a fitted to the cover member 28b. The cover member 28b is detachably fitted to the reel body 2a to the rear of a flange 2g formed at the front part of the reel body 2a so as to be covered by the rear end of the cylindrical component 30 of the rotor 3. In the fitting portion of the cover member 28b, a through hole 2f having an inner peripheral surface with a diameter larger than the maximum outside diameter of the second gear 38 is formed in the bottom of the reel body 2a. The cover member 28b is fitted into this through hole 2f. The cover member 28b is fixed to the reel body 2a by screws 23.

With this structure, the outside diameter of the second gear 38 is larger than the outside diameter of the first gear 37, and the through hole 2f whose diameter is larger than the outside diameter of the second gear 38 is formed in the fitting portion of the cover member 28b, so when the cover member 28b is opened, the two gears 37 and 38 can be taken out along with the linking shaft 36. Accordingly, when these gears 37 and 38 are to be coated with grease or the like during maintenance, there is no need to disassemble the oscillating mechanism 6 or the spool shaft 15. Maintenance of the rotation transmission device 14 is therefore easier.

(c) The above embodiments make use of a traverse cam type of oscillating mechanism having a spiral shaft, but the present invention can also be applied to a reduction cam type of oscillating mechanism that converts the rotation of the handle into reciprocal motion by means of a rotational cam mechanism.

With the present invention, one end of the linking shaft is supported by the first bearing component, which is detachably fixed to the reel unit, and the other end is supported by a second bearing component furnished on the reel unit. Therefore, just the second bearing component supporting the other end of the linking shaft needs to be built into the reel unit, and not the first bearing component. Accordingly, a high-precision first bearing component can be fabricated more easily and from fewer parts, just one bearing component has to be built into the reel unit with its complicated shape, the precision of the second bearing component is easier to maintain, and the mounting precision of the linking shaft can be kept high. Furthermore, since the first bearing component has a simpler shape than when it is built into the reel unit, the overall weight of the reel can be reduced.

In another aspect of the invention, the first bearing component is fitted in a through hole formed to the rear of the rotor, and the second gear, which is close to the first bearing component, has a smaller diameter than the first gear, so merely removing the first bearing component from the reel unit allows the linking shaft to be taken out of the through hole along with both gears. Accordingly, there is no need to remove the rotor or open any other portion of the reel unit and take out the parts of the reciprocative shifting mechanism or the spool shaft, which facilitates the maintenance of the rotation transmission device.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A spinning-reel rotation transmission device for use in a spinning reel including a handle assembly having a handle and a face gear, a reel unit having a reciprocative shifting mechanism, a rotor, and a spool, said spinning-reel rotation transmission device being for transmitting rotation of the handle to the reciprocative shifting mechanism for reciprocatingly shifting back-and-forth the spinning-reel spool fitted to the reel unit frontward of the rotor, the spinning-reel rotation transmission device comprising:

a pinion gear extending along an axis that is skew relative to a rotational axis of the handle, said pinion gear being adapted to receive rotation transmitted from the handle by meshing with the face gear;

a linking shaft disposed along an axis skew relative to said pinion gear and being adapted to link the reciprocative shifting mechanism and said pinion gear;

a first bearing component fixed to be attachable to and detachable from the reel unit, for rotatively supporting one end of said linking shaft;

a second bearing component provided in the reel unit, for rotatively supporting the other end of said linking shaft;

a first gear provided on said linking shaft, for meshing with said pinion gear;

a second gear provided on said linking shaft in a different location from said first gear; and a third gear that is linked to the reciprocative shifting mechanism, for meshing with said second gear.

2. A spinning-reel rotation transmission device as set forth in claim 1, wherein:

said pinion gear is a screw gear; and said first gear is a screw gear for meshing with said pinion gear.

3. A spinning-reel rotation transmission device as set forth in claim 1, wherein:

said second gear is a worm gear; and said third gear is a worm wheel.

4. A spinning-reel rotation transmission device as set forth in claim 1, wherein:

said second gear is a screw gear; and said third gear is a screw gear for meshing with said second gear.

5. A spinning-reel rotation transmission device as set forth in claim 1, wherein said linking shaft is disposed diagonally with respect to a plane vertically bisecting the reel unit.

6. A spinning-reel rotation transmission device as set forth in claim 1, wherein:

said reciprocative shifting mechanism includes a worm disposed substantially parallel to said pinion gear, said spool shifts reciprocatingly by engaging said worm and receiving rotation of said worm, and said third gear is non-rotatably fitted to said worm.

7. A spinning-reel rotation transmission device as set forth in claim 1, wherein:

a through-hole having an inside diameter larger than said second gear in outside diameter is formed in the reel unit rearward of the rotor in said spinning reel, said first bearing component being fitted in the through-hole; and said second gear is disposed endwise on said linking shaft, and has at least the same diameter as or a larger diameter than said first gear.

8. A spinning-reel rotation transmission device as set forth in claim 1, wherein the gear ratio between said pinion gear and said third gear is between 4:1 and 24:1.

9. A spinning-reel rotation transmission device as set forth in claim 1, wherein said first bearing component includes:

a lid member fitted to allow attachment to and detachment from the reel unit; and a ball bearing fitted to said lid member, one end of said linking shaft being rotatably supported by said ball bearing.

10. A spinning reel comprising:

a handle assembly having a handle and -a face gear, said face gear receiving rotation of said handle;

a reel unit that rotatably supports said handle, said reel unit having a rotation transmission device and a reciprocating shifting mechanism, said rotation transmission device including, a pinion gear extending along an axis that is skew relative to a rotational axis of said handle, said pinion gear being adapted to receive rotation transmitted from said handle by meshing with said face gear, a linking shaft disposed along an axis skew relative to said pinion gear and being adapted to link said reciprocative shifting mechanism and said pinion gear, a first bearing component fixed to be attachable to and detachable from said reel unit, for rotatably supporting one end of said linking shaft, a second bearing component provided in said reel unit, for rotatably supporting the other end of said linking shaft, a first gear provided on said linking shaft, for meshing with said pinion gear;

a second gear provided on said linking shaft in a different location from said first gear, and a third gear that is linked to said reciprocative shifting mechanism, for meshing with said second gear;

a rotor rotatably supported by a front part of said reel unit; and a spool having an outer peripheral surface around which fishing line is wound, said spool being disposed adjacent a front part of said rotor, said rotation transmission device transmitting rotation of said handle to said reciprocative shifting mechanism to shift said spool back and forth.

11. A spinning reel as set forth in claim 10, wherein:

said pinion gear is a screw gear; and said first gear is a screw gear for meshing with said pinion gear.

12. A spinning reel as set forth in claim 10, wherein:

said second gear is a worm gear; and said third gear is a worm wheel.

13. A spinning reel as set forth in claim 10, wherein:

said second gear is a screw gear; and said third gear is a screw gear for meshing with said second gear.

14. A spinning reel as set forth in claim 10, wherein said linking shaft is disposed diagonally with respect to a plane vertically bisecting said reel unit.

15. A spinning reel as set forth in claim 10, wherein:

said reciprocative shifting mechanism includes a worm disposed substantially parallel to said pinion gear, said spool shifts reciprocatingly by engaging said worm and receiving rotation of said worm, and said third gear is non-rotatably fitted to said worm.

16. A spinning reel as set forth in claim 10, wherein:

a through-hole having an inside diameter larger than said second gear in outside diameter is formed in said reel unit rearward of said rotor, said first bearing component being fitted in the through-hole; and said second gear is disposed endwise on said linking shaft, and has at least the same diameter as or a larger diameter than said first gear.

17. A spinning reel as set forth in claim 10, wherein a gear ratio between said pinion gear and said third gear is between 4:1 and 24:1.

18. A spinning reel as set forth in claim 10, wherein said first bearing component includes:

a lid member fitted to allow attachment to and detachment from said reel unit; and a ball bearing fitted to said lid member, one end of said linking shaft being rotatably supported by said ball bearing.

* * * * *